United States Patent
Tateson et al.

(10) Patent No.: US 8,428,012 B2
(45) Date of Patent: Apr. 23, 2013

(54) CHANNEL SELECTION IN AD HOC WIRELESS NETWORK

(75) Inventors: Richard E Tateson, Woodbridge (GB); Fabrice T. P. Saffre, Ipswich (GB); Jane E Tateson, Ipswich (GB)

(73) Assignee: British Telecommunications public limited company, London (GB)

( * ) Notice: Subject to any disclaimer, the term of this patent is extended or adjusted under 35 U.S.C. 154(b) by 1051 days.

(21) Appl. No.: 12/307,967

(22) PCT Filed: Jul. 10, 2007

(86) PCT No.: PCT/GB2007/002563
§ 371 (c)(1), (2), (4) Date: Jan. 8, 2009

(87) PCT Pub. No.: WO2008/007070
PCT Pub. Date: Jan. 17, 2008

(65) Prior Publication Data
US 2009/0310545 A1    Dec. 17, 2009

(30) Foreign Application Priority Data

Jul. 11, 2006  (EP) .................................... 06253628

(51) Int. Cl.
*H04W 4/00* (2009.01)
(52) U.S. Cl.
USPC .......................................... 370/329; 370/328
(58) Field of Classification Search ................... 370/328, 370/329
See application file for complete search history.

(56) References Cited

U.S. PATENT DOCUMENTS

| | | | |
|---|---|---|---|
| 5,448,750 A * | 9/1995 | Eriksson et al. ........... 455/452.2 |
| 6,539,228 B1 | 3/2003 | Tateson | |
| 6,941,140 B2 | 9/2005 | Tateson | |
| 7,565,149 B2 | 7/2009 | Saffre et al. | |
| 2002/0168983 A1 * | 11/2002 | Kumaran et al. ............. 455/446 |
| 2003/0033394 A1 | 2/2003 | Stine | |
| 2004/0032853 A1 * | 2/2004 | D'Amico et al. ............. 370/349 |
| 2004/0185887 A1 | 9/2004 | Wolman et al. | |
| 2005/0190784 A1 | 9/2005 | Stine | |
| 2005/0204026 A1 | 9/2005 | Hoerl | |

FOREIGN PATENT DOCUMENTS

| | | |
|---|---|---|
| WO | 03/021886 | 3/2003 |
| WO | WO 03/021886 | 3/2003 |
| WO | 2005/011203 | 2/2005 |
| WO | WO 2005/029788 | 3/2005 |

OTHER PUBLICATIONS

International Application No. PCT/GB2007/002563, mailed Oct. 2, 2007.
John A. Stine, "Spectrum Management: The Killer Application of Ad Hoc and Mesh Networking", Oct. 2005—available via Download Document button on this web-page http://www.mitre.org/work/tech_papers/tech_papers_05/05_1166/index.html (10 pgs.).
Jungmin So and Nitin H. Vaidya. 2004. Multi-channel mac for ad hoc networks: handling multi-channel hidden terminals using a single transceiver. In Proceedings of the 5th ACM international symposium on Mobile ad hoc networking and computing (MobiHoc '04). ACM, New York, NY, USA, 222-233 (12 pgs.).

* cited by examiner

*Primary Examiner* — Kenny Lin
(74) *Attorney, Agent, or Firm* — Nixon & Vanderhye P.C.

(57) ABSTRACT

The present invention relates to channel selection in ad hoc wireless networks. The present invention provides a method of selecting a channel for a node in an ad hoc network of nodes, the method comprising: increasing a preference score for a channel (E) in response to receiving a stimulatory control message (hoot x) associated with the channel from another node; decreasing the preference score for the channel (A) in response to receiving an inhibitory control message (hoot y) associated with the channel from another node; selecting a channel dependent on the preference score for the channel.

15 Claims, 4 Drawing Sheets

CHANNEL SELECTION IN AD HOC WIRELESS NETWORK

This application is the U.S. national phase of International Application No. PCT/GB2007/002563, filed 10 Jul. 2007, which designated the U.S. and claims priority to Europe Application No. 06253628.9, filed 11 Jul. 2006, the entire contents of each of which are hereby incorporated by reference.

FIELD OF THE INVENTION

The technical field of this disclosure relates to channel selection in ad hoc wireless networks.

BACKGROUND OF THE INVENTION

Large groups of wireless nodes attempting to communicate with each other must coordinate a channel architecture in order to communicate with certain nodes on certain channels whilst avoiding interfering with other nodes on those channels. U.S. Pat. No. 6,941,140 describes a system for avoiding interference on channels amongst a group of nodes in a centralised wireless architecture such as a cellular network. The nodes in this network are not forming communication links with any other nodes, but use uninterfered channels to communicate with handsets. Test signals are transmitted/received on different channels in order to determine channel preferences amongst nodes by inhibiting channel selection, and allow them to avoid interfering with each other. On high preference channels the transmission power is increased which further inhibits receiving nodes from using this channel. EP1074161 describes a centralised prediction mechanism which can also be used to estimate the effect of channel use on other nodes use of the channel; which may also be used as an inhibitory factor.

WO2005/029788 describes a mechanism by which a node in a decentralised (ie ad hoc) network determines a channel to use, and in which an initial high power "discovery" phase is used whereby the node listens/transmits on a channel, and if quiet reverts to a lower power setting for normal communication on that channel.

WO2005/0011203 describes a system in which groups of nodes sharing a channel can migrate to another channel, for example because of increased interference from non-group members.

US Patent application 2004/0185887 discloses a wireless network in which some nodes have two or more transceivers which can operate on different frequency channels. Each node keeps a record, for each of its neighbours, of the quality of channels to each known network interface on that neighbour. A channel is then selected for communication with each neighbour in dependence on the measured channel qualities.

SUMMARY OF THE INVENTION

In one aspect there is provided an ad hoc wireless network comprising a number of nodes each having a number of transceivers on different channels and communicating with one other node on each said channel. These exclusive paired connections are maintained using stimulatory and inhibitory control messages or signals between the pairs of nodes and associated with their respective channels. The control messages, whilst stimulatory to the paired nodes, are inhibitory to other nodes.

The term channel here is used in a generic sense to mean a link or connection between two or more nodes, and may in fact include two twinned channels in order to implement a duplex link for example.

In another aspect there is provided a method of scoring channels for a node in an ad hoc network of nodes, the method comprising increasing a preference score for a channel in response to receiving a stimulatory control message associated with the channel from another (paired) node; and decreasing the preference score for the channel in response to receiving an inhibitory control message associated with the channel from another (non-paired) node. The node may select one or a number of channels for use, the selection of the or each channel for use being dependent on the preference scores for the scored channel.

In an embodiment a plurality of different channels are selected by the node, each channel for communicating with another node. The selected channels may be replaced by other channels having newly elevated preference scores and/or by the de-selection of a previously selected channel due to a deterioration in quality of the channel, a lack of data being exchanged on the channel, and/or a down-grading of its preference score.

In another aspect there is provided a method of selecting channels for a node in an ad hoc network of nodes, the method comprising: transmitting a first control message (hoot x) associated with a first channel (E), and increasing an associated first channel score (score-E) in response to receiving a second control message (hoot y) associated with said first channel (E) from another node; decreasing a second channel score (score-A) in response to receiving a second control message (hoot y) associated with said second channel (A) from another node in the absence of transmitting a first control message (hoot x) associated with said second channel (A); selecting a channel dependent on the associated channel score.

In another aspect there is provided a method of selecting a channel for a node in an ad hoc network of nodes, the method comprising: increasing a preference score (score-E) for a channel (E) in response to receiving a stimulatory control message (hoot x) associated with the channel from another node; decreasing the preference score (score-E) for the channel (E) in response to receiving an inhibitory control message (hoot y) associated with the channel from another node; and selecting a channel dependent on the preference score for the channel.

In an embodiment, the method further comprises transmitting a second control message (hoot y) associated with said first channel (E) in response to receiving a first control message (hoot x) associated with said first channel from another node.

By using both inhibitory and stimulatory control signals, a stable yet flexible network can be created by allocating the selected channels. The stimulatory effect encourages nodes to form exclusive pairings with other nodes, rather than merely relying on passive inhibition of the use of noisy channels. This allows a network to more dynamically respond to changes in the network such as moving nodes or new sources of interference.

By using anonymous control signals, rather than control signals which identify the sender, a channel allocation method is provided which is simple and thus uses less processor resource, than is required in prior-art approaches. The method is nevertheless well-suited to maintaining network connectivity. The data structure at the core of embodiments of the present invention is each node's list of channels available to it and a preference score for each channel. Again, the simplicity of this arrangement is well-suited to mobile nodes with limited power.

In an embodiment the first channel score (score-E) is only increased in response to receiving a second control message (hoot y) associated with said first channel (E) from another node within a first predetermined receptive or listening time of transmitting the first control message (hoot x). The listening time may be reduced as a fraction of the entire period of performing the channel selection method in order to reduce power consumption, and/or to avoid synchronous effects—that is increasing the preference score in response to receiving uncorrelated control messages. Uncorrelated control messages are those which are not exchanged with a paired node, or a node trying to pair, but may be an "unlucky" control message from a third node testing the current channel which is already being used by the current node and one other.

In an embodiment, receiving a stimulatory control message comprises receiving a response control message (hoot y) associated with said channel (E) from another node within a predetermined period following transmission of a challenge control message (hoot x) associated with said channel (E) and, receiving an inhibitory control message comprises receiving a response control message (hoot y) associated with said channel (A) from another node (4) in the absence of first transmitting a challenge control message (hoot x) associated with said channel (A).

Increases of the preference scores may be configured to only occur following receipt of one (eg the first) second control message (hoot y) within the predetermined listening period, or the preference score may be increased upon receipt of each second control message within the listening period. As a further alternative, the listening period may extend only until a first second control message (hoot y) is received. Similarly responding to a challenge control message (hoot x) with a response control message (hoot y) may occur at all such occasions within the listening period, only once, or may terminate the listening period.

In an embodiment the second control message (hoot y) associated with said first channel (E) is only transmitted in response to receiving a first control message (hoot x) associated with said first channel from another node within a second predetermined receptive time. This may be the same as or different from the above mentioned (first) listening period.

In an embodiment, a ranked list of preference scores associated with respective channels is provided and used together with a preference score rating in order to determine when to change a previously selected channel. The preference score rating is a number between the number of channels available to a node (eg 3) and the total number of channels available within the network (eg 24). With a low rating, (eg 3), the node will tend to change channels whenever there is a change in the ranked list, however with a high rating (eg 24) the node will only change channels when their quality degrades. Adjusting this rating allows tuning of the network between highly stable and highly dynamic.

In an embodiment, all of the channels available to a node are simultaneously monitored for receiving an inhibitory control message associated with the channel from another node; and one of said channels is monitored at a time for receiving a stimulatory control message associated with the channel from another node; the channel for monitoring for a stimulatory control signal is determined using a random selector together with the channels' associated preference score.

In an embodiment the stimulatory and inhibitory control messages associated with each channel are transmitted on one of: a common control channel wherein a message comprises a respective channel identifier; separate control channels each corresponding to a said channel such as respective sidebands for example; or within the respective channels themselves.

BRIEF DESCRIPTION OF THE DRAWINGS

Embodiments will now be described with reference to the following drawings, by way of example only and without intending to be limiting, in which.

DETAILED DESCRIPTION

Figure 1:
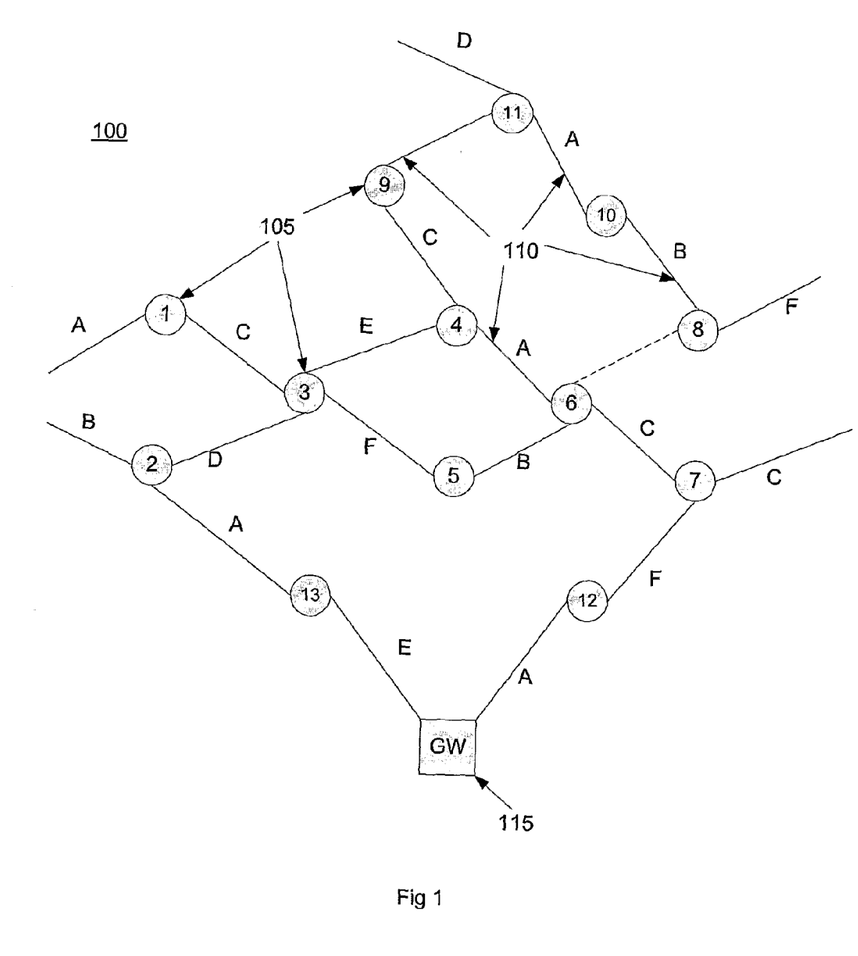
FIG. 1 is a schematic of a sensor network according to an embodiment.

FIG. 1 illustrates an ad hoc wireless network 100 according to an embodiment in which each node 105 has a plurality of airlinks 110 or possible channel or connection resources each operating on a different channel (A-F). Each node communicates with adjacent nodes using a different channel for each connection 110. Typically the channels (A-F) are selected such that the connections using common channels are sufficiently distant so as to avoid or minimise interference between them. The different channels may be frequency divided, different time slots or codes for example. Compared with known network arrangements in which a single channel is shared between a number of adjacent nodes and access to the channel is contended for, the arrangement of FIG. 1 has a number of advantages.

Because pairs of nearby or adjacent nodes have exclusive use of a channel to communicate between them, they are able to transfer more data between them, and more quickly. The network is also more resistant to degradation by accidental or deliberate (jamming) interference since while some communication links will be disrupted, others will survive. The packet-processing load on each node is decreased, at the expense of introducing a signalling load to the system. In other words a node does not have to do the work of sorting data from many different origins because each origin supplies data via a unique channel. In addition, certain data types may benefit from having a single open channel rather than shared use of a contended channel; for example real-time streamed data.

In a typical application, sensor nodes 105 are deployed, and the sensor data gathered by each node is transmitted towards a gateway or base station node 115 with greater processing, transmission, and power resources and which can interface with other systems or a user. The sensor data from distant nodes 105 is then transferred over multiple hops to closer nodes and so on to the gateway node 115. For example sensor data from node 105(6) can be transferred to node 115(7) over channel C, then to node 105(12) over channel F, and finally to the gateway node 115 over channel A. The use of the exclusive pairing of channels at the link layer allows rapid transfer of data from distant nodes 105 to the gateway node 115 without the need for contention protocols or other channel sharing delays.

Figure 2:
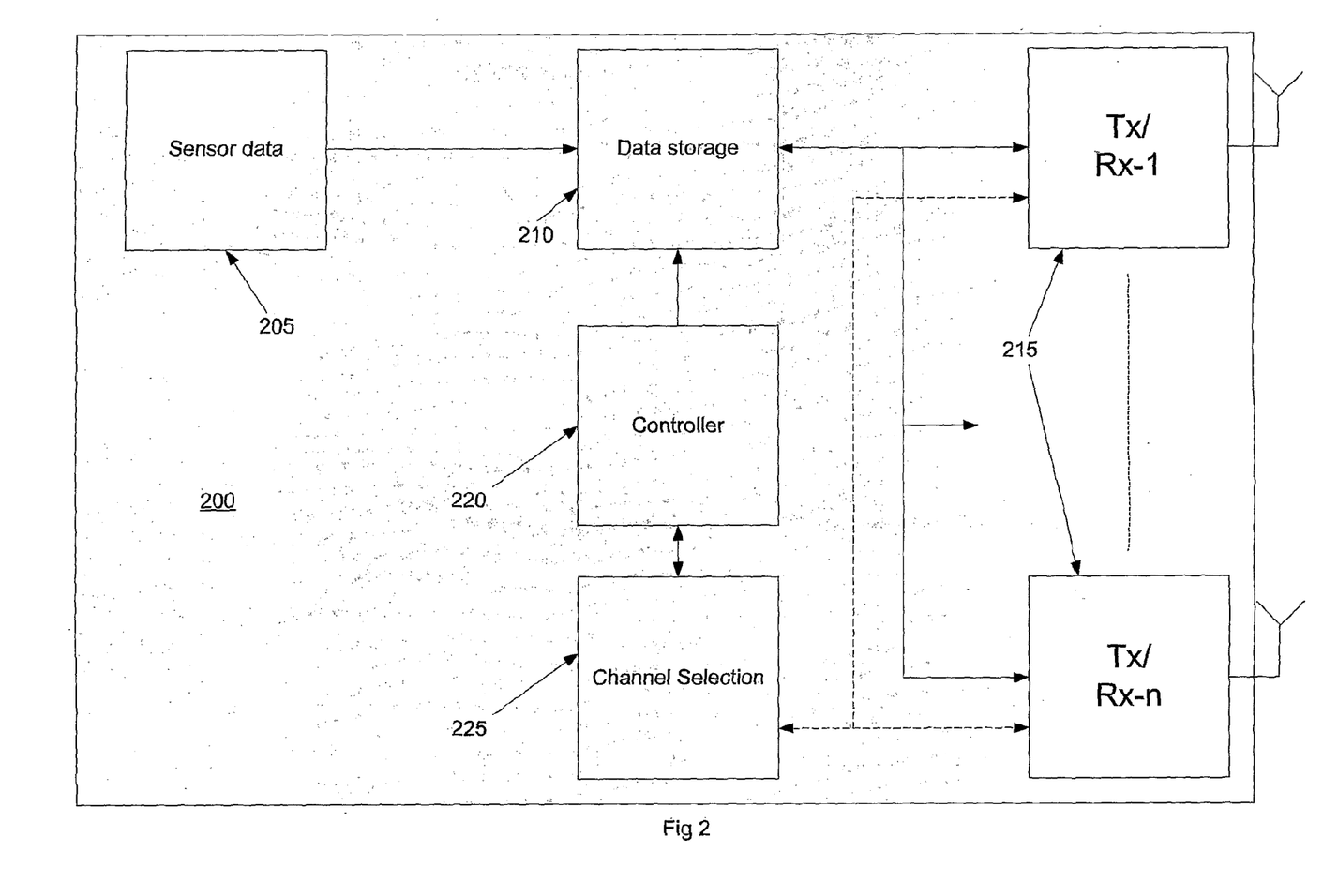
FIG. 2 is a schematic of a sensor node according to an embodiment.

FIG. 2 illustrates a sensor node according to an embodiment. The sensor node 200 comprises a sensor data gathering function 205 such as a temperature, acoustic, and/or pressure sensor and sampling circuitry, a data storage function 210 such as a non-volatile flash memory, two or more transceivers 215(1)-215(n) each providing a single airlink or data transfer connection (110) to another node by transmitting and receiving data on a single channel The single channel could actually be twinned channels allowing simultaneous transmit and receive. This would allow data exchange as a simple bit stream. Alternatively the single channel may only allow one-way communication, necessitating a synchronisation protocol between the nodes to allow them to coordinate when to send and when to receive. Transmission and reception could still be bit stream in the arranged time slots. Packet-based protocols are a well known alternative. The node 200 also comprises a controller function 220 which allocates separate channels to each transceiver 215, and which incorporates handshaking and other link layer functions. The controller may also further comprise network and higher layer functions in order to transfer sensor data to the gateway node (115) and gather and forward sensor data from more distant nodes (105) towards the gateway node (115) of FIG. 1 for example. The node 200 also comprises a channel selection function 225 which selects a set of suitable channels for allocation to the various transceivers; typically allocating some measure of suitability such as a preference score for each channel.

Figure 3:
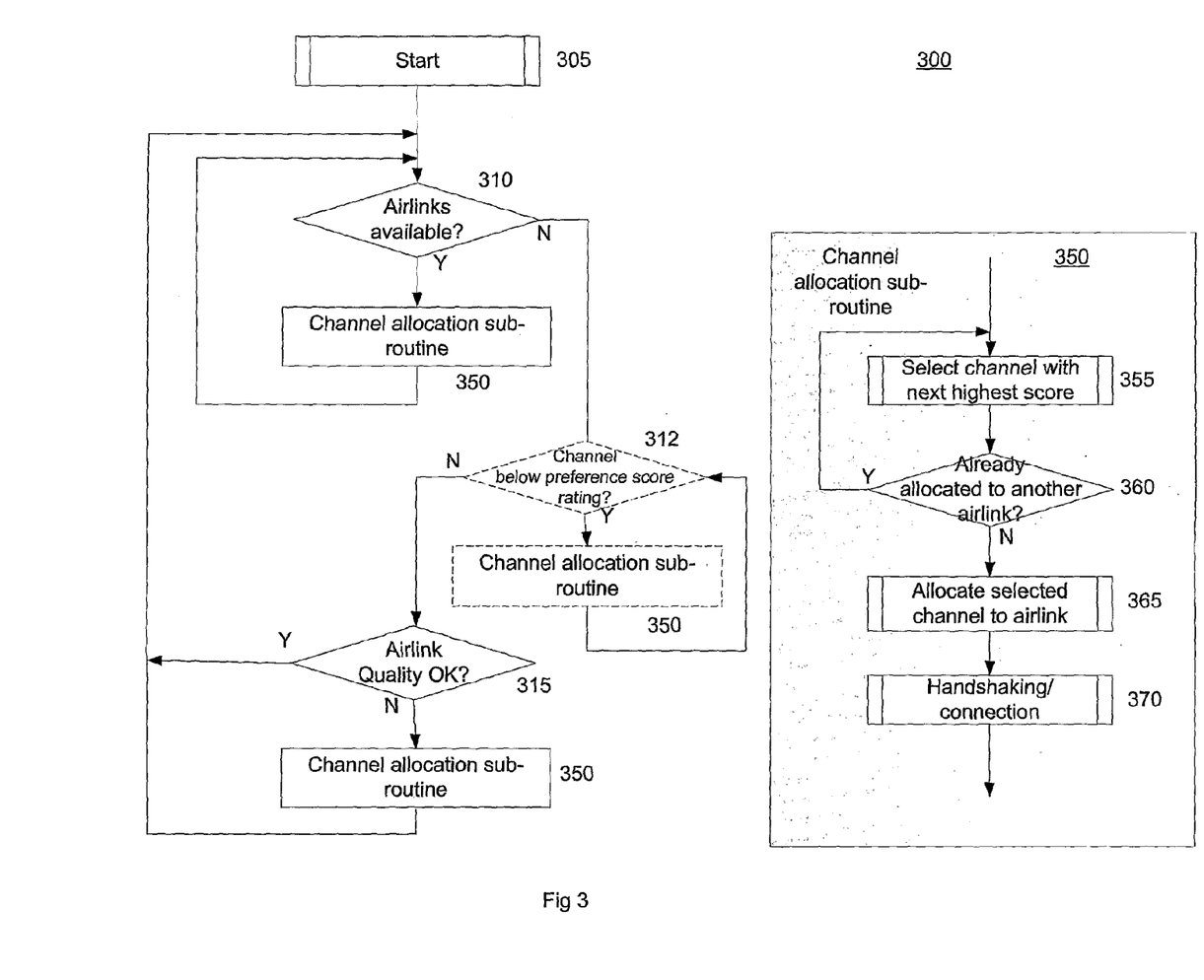
FIG. 3 is a flow diagram of a method of selecting a channel according to an embodiment.

Operation of the controller 220 at the link layer is described with respect to FIG. 3. The method 300 comprises a starting or power-on step 305, following which the controller determines whether there are any airlinks available or not currently being used 310. In this step the controller determines whether any of the transceivers (215) have not been allocated a channel on which to operate. If there are airlinks available 310Y, then the method moves on to the channel allocation sub-routine 350, in which one of the suitable channels selected by the channel selection function 225 is allocated to one of the airlinks. Typically the selected channels will be allocated in order of their preference scores. Once a channel has been allocated to one of the airlinks or transceivers (350), then the method returns to determine whether any further airlinks are available (310).

If all of the airlinks or transceivers are in use 310N, then the method moves on to check whether the channel or airlink quality on each transceiver is adequate 315. If one of the channels has degraded below a quality threshold (eg BER) and is therefore inadequate for an airlink 315N, then the method moves on to the channel allocation sub-routine 350 again in order to re-allocate another channel to the airlink. Once the low quality airlinks have been allocated a new channel, or if all the airlinks have adequate quality 315Y, then the method returns again to check whether there are any airlinks with unallocated channels (310). This might occur for example because a node which one of the airlinks was communicating with has moved out of range. Thus the airlinks available step (310) may also check that data is being transferred on each airlink, such that a new channel is allocated if there is no data transfer.

This method only changes channel on a transceiver (215) or airlink connection (110) when the current channel falls below a quality threshold, even if the currently allocated channels do not reflect those selected by the channel selection function 225 and having the highest preference scores. This reduces unnecessary channel re-allocation and hence signalling overhead, and therefore maximises the amount of data transfer possible.

In an alternative arrangement, the method allows an above-threshold airlink to change channel simply because its preference score as determined by the channel selection function 225 has moved too far down a ranked list of preference scores. Thus the method moves on to check whether the airlink quality is adequate as before, but additionally checks that the preference score for the channel is no lower than a preference score rating in the ranked preference score list—this is indicated in dashed outline by step 312. The preference score rating is a number (n) between the total number of airlink transceivers 215 at the node and the total number of available channels A-F within the system. This allows the node to temporarily keep open silent channels, which from the network point of view allows a 'better' overall allocation of channels to be produced even if this means that some perfectly serviceable airlinks will be changed. Thus for example if node 3 changes its still functional but low preference score use of channel E to use channel B (the channel with the highest preference score currently not already used by node 3) then this might clear the way for use of channel E by another node currently experiencing interference.

The preference score rating (eg nth) may be determined at deployment time or adjusted autonomously by the node. The main reason for generally avoiding changes of channel is the wasted time while nodes drop one and pick up another channel. In extreme cases this may result in 'dithering' where a node oscillates among several channels, never settling on one long enough to transmit or receive any data. A node can be configured to assess its own ditheriness (eg how many channel changes in last x seconds) and set its preference score rating autonomously in order to reduce this effect. A dithering node should set a high preference score rating (eg closer to the total number of network channels) in order to reduce channel switching and hence introduce greater stability. A node which has not changed for a long time might be blocking the whole network from finding a globally better allocation of channels and could therefore be configured to reduce it preference score rating (eg towards its number of transceivers) in order to encourage swapping of one of its higher preference channels.

The ranked preference list comprises the full list of channels A-F available to the node, ranked highest to lowest by the current preference score. Thus if the preference score rating is set at 6 for a particular node, a channel change will occur if quality is below a threshold (eg BER), or a channel change will occur if the channel in question is ranked lower than $6^{th}$ in the ranked preference score list.

Setting the preference score rating to the number of available channels (6 for A-F) would have the same effect as the first method, that is only changing the channel when its quality falls below a quality threshold. On the other hand, setting a preference score rating lower (eg the number of transceivers=3) than the number of available channels (A-F) would allow spare or unused channels to come into use even when the existing channels in use at a node are functioning adequately which may be beneficial for some network applications. For example in the case of a network which has deteriorated into a sub-optimal state whereby use of some low preference but still functioning channels at some nodes prevents the network as a whole from achieving a better overall state (fewer conflicted channels). Setting the preference score rating at intermediate values allows changing of channels which have been severely down-graded by the selection function 235, though generally not channels that have been modestly down-graded perhaps due to temporary factors.

The channel allocation sub-routine 350 selects a channel from a set of channels (A-F) with the highest preference score 355 as determined by a channel selection algorithm described below with respect to FIG. 4. This algorithm results in each channel in the set having an associated channel preference score, and the channel with the highest preference score is initially selected (355). The method then determines whether this channel has already been allocated to one of the airlinks or transceivers 360, and if so 360Y, the method returns to select the channel with the next highest preference score and so on until an unallocated channel with the highest score is selected 360N. Once an unallocated channel has been selected 360N, the method allocates this channel to the currently considered airlink or transceiver 365. The controller method then typically performs a link layer handshaking routine 370 in order to form a connection with another node using the allocated channel. Once this is completed, the two nodes can then exchange data, and the sub-routine 350 returns to the main method 300.

Figure 4:
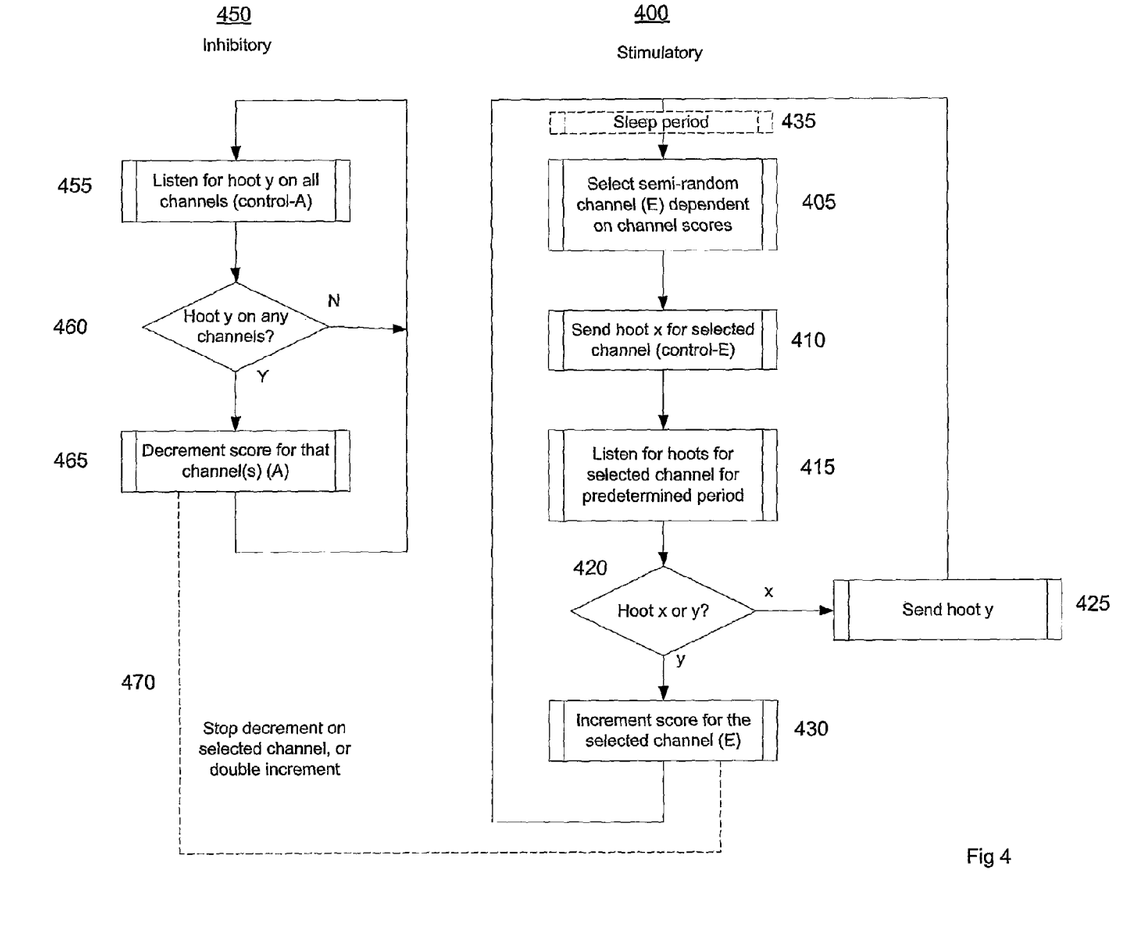
FIG. 4 is a flow diagram of a method of preference scoring channels for selection according to an embodiment.

FIG. 4 illustrates a channel selection method for implementing the channel selection function (225) according to an embodiment and which assigns preference scores to each of a set of channels that can be used by a node (105). The method has two independent or partially independent algorithms—an inhibitory algorithm (450) which reduces a channel's preference score in response to receiving an inhibitory control message associated with the channel from another node, and a stimulatory algorithm (400) which increases a channels preference score in response to receiving a stimulatory control message associated with the channel from another node.

The stimulatory algorithm (400) monitors one channel at a time and initially selects a channel for monitoring from a set of available channels using a random selector or variable together with the channel's current preference score 405. Thus the selection of a channel for monitoring is semi-random but with increasing likelihood as the channel's preference score increases. A channel with a high preference score is therefore more likely to be selected. Various algorithms could be used to implement this step as would be appreciated by those skilled in the art. For example the likelihood of a channel being selected could be directly proportional to its preference score. It might be desirable, in certain use cases, to move away from direct proportionality, in order to somewhat increase the chance of low preference channels to be selected which would tend to encourage more dynamic swapping of channels. Alternatively the chance of high preference channels could be increased even further which would tend to produce a more stable, but also more static network. At start-up of the nodes, all channel scores will be equal and so the channel selection will be completely random, and in some embodiments this completely random behaviour may be retained. As a further alternative, a number or even all of the channels in a set may be monitored simultaneously by the stimulatory algorithm, in a similar manner to which all the channels are monitored by the inhibitory algorithm as described in more detail below.

In this embodiment, an analogy with hooting owl pairs is used to aid illustration, and in which two types of signal or hoot are used—a challenge message (hoot x) and a response message (hoot y). Once a channel (eg E) has been selected, the node sends a challenge control message (hoot x) associated with the selected channel (E) 410. This challenge control message (hoot x) may be transmitted on to a dedicated control channel (control-E) associated with the selected channel (E), for example a sideband of the selected channel. Alternatively the control message may be transmitted onto a common control channel (control) shared by control messages associated with all the channels (A-D, F). In this case, each control message will comprise a channel identifier in order to distinguish it from control messages associated with other channels. In a yet further alternative arrangement, the control messages may be delivered on the associated channel (E) itself, being transmitted onto the selected channel (E) together with data, and separated using time or some other mechanism for separating the two as would be understood by those skilled in the art.

Once the challenge control message (hoot x) has been transmitted, the method then listens for a challenge (hoot x) or a response (hoot y) control message from other nodes 415 within a predetermined (listening or receptive) time. If a challenge control message (hoot x) is received from another node 420x within this predetermined time or receptive period, then the method transmits a response control message (hoot y) onto the control channel (control-E) associated with the selected channel (E) 425. The method 400 then returns to the channel selection step 405 and repeats the stimulatory algorithm with (typically) a different channel. If a response control message (hoot y) is received from another node 420y, then the preference score for the selected channel (E) is increased 430, and the method returns to the channel selection step 405 and repeats the stimulatory algorithm.

The effect of this stimulatory algorithm on a nodes scoring of various channels over time is to increase the preference scores associated with the monitored channels in response receiving a response control message (hoot y) after transmitting a challenge control message (hoot x). In parallel, the node responds to received challenge control messages (hoot x) from other nodes with a transmitted response control message (hoot y), which will have the effect of increasing the preference score for the monitored channel on the other node. Thus a challenge control message (hoot x) which receives a response control message (hoot y) will stimulate the use of a selected channel between two nodes.

The listening (415) for control messages continues for a predetermined period after transmission of the challenge message (410). This predetermined receptive period is typically less than 100% of the total period of the algorithm (400) in order to reduce (battery) power consumption. From a network control point of view, very long receptive periods can be undesirable since they increase the likelihood of receiving uncorrelated 'lucky' signals. A correlated control message or signal (hoot x or y) is one which is received by a node either in direct response to one of its own signals (hoot x) or because it has previously influenced a neighbour node to 'prefer' the channel in question and the neighbour node is therefore more likely to initiate signals (hoot x) on that channel. Uncorrelated signals are control messages from other nodes (not paired), neither responding to a particular signal from the current node nor obviously related to a previous history of signals between the current node and a "paired" node. Although uncorrelated signalling can inappropriately influence the preference scoring process, it does introduce flexibility—the chance to take a new direction and perhaps find a more optimal solution. However extended listening or receptive periods are power consuming. Thus if, for reasons of power saving or avoiding polluting the airwaves, the nodes have been configured to issue initial or challenge control messages (hoot x) relatively infrequently, then they might also be configured to only listen for a small fraction of the 'interhoot' period.

The algorithm may be arranged to transmit a response control message (hoot y) for every challenge message (hoot x) received during the predetermined listening period. Similarly every response control message (hoot y) received during this period increments the preference score for the currently monitored channel. In an alternative arrangement, a response message (hoot y) is only transmitted after the first received challenge message (hoot x), and similarly the preference score will only be incremented once in response to any number of response control messages (hoot y) being received during the receptive or listening period. This avoids a prematurely quick convergence on a particular, perhaps not particularly beneficial, channel due to several 'lucky' hoots in one listening period. In a further alternative, the listening period is not predetermined and only continues until either a challenge and/or a response control message (hoot x or y) is received, then either the monitored channel's preference score is increased or a response message (hoot y) is transmitted as appropriate; and the method returns to the selection of the next channel for monitoring (405). This can speed up convergence on good channels because a node can signal again as soon as it has stopped listening. Alternatively together with the implementation of a sleep period (435), this leaves the radio interface slightly quieter and reduces power consumption because the node is going to wait a length of time anyway before signalling again, but now does the waiting while asleep rather than listening.

A sleep period (435) may be used irrespective of the arrangement for increasing the preference score or responding to challenge control messages and will typically be incorporated prior to selecting the channel for monitoring (405). Increasing the pause or sleep length allows more data to be sent on the channel between the control messages when an in-channel control message signalling arrangement is used. Adjustment of this sleep period together with the listening period can be used to adjust the fraction of the entire algorithm (400) time which is devoted to listening for control messages as noted previously. Increasing the pause length also reduces interference on data channels where the control channel is sufficiently 'close' in radio terms. However this also slows the ability of the nodes to respond to changes in usage of the channels.

The predetermined listening period, and if used the pause or sleep period, of the stimulatory algorithm may be set the same for all nodes, or they may be set on a per-node basis. Setting different sleep or pause periods for the nodes avoids unlucky synchronised effects whereby certain nodes can never perceive each other because they are always 'out of phase'. Alternatively these periods may be autonomously and dynamically determined by each node dependent on message signalling and/or data traffic density. Again this avoids the synchronicity problem and would allow the network to be more efficient at signalling when the data exchange is low, but reduce signalling when the radiowaves are really needed for passing data. So a data-busy node would not do so much signalling. In a further alternative, the periods may be determined according to a randomly selected listening period which is modified dependent on the density of control message exchange and/or data exchange. Again this would avoid the synchronicity problem.

These listening and/or pause periods may also be varied depending on whether the nodes are in exclusive pairings with other nodes on their different airlinks/channels. Thus for example a high preference allocated channel may not have its pause and/or listening period varied in order to try to maintain synchronicity with its "paired" node. As the preference score for a channel falls, its pause and/or listening periods may be allowed to vary.

In a further alternative arrangement, receiving a challenge message (hoot x) and responding with a response message (hoot y) may also be used to increase the preference score for the currently monitored channel.

The inhibitory algorithm 450 listens for inhibitory or response control messages (hoot y) from other nodes and associated with each channel 455 in the set of channels. Thus the response control message (hoot y) operates as both a stimulatory and an inhibitory control message in this embodiment. As discussed above, these control messages may be received on dedicated control channels (control-A) each associated with a particular channel (A), on a common control channel (control), or on the (data) channel itself. If no response control messages are received 460N, then the algorithm returns to the listening step 455. If however response control messages (hoot y) are received 460Y, then the algorithm decreases the preference score associated with the channel (A) for which the response control message (hoot y) was received 465. The algorithm then returns to the listening step 455. In practice, the listening period for the inhibitory algorithm is continuous; although a sleep or pause period could be introduced prior to the listening step 455 in order to reduce power consumption for this task.

The effect of this inhibitory algorithm on a nodes preference scoring of various channels over time is to reduce the scores associated with channels receiving a response control message (hoot y). When a response control message (hoot y) is received on the monitored channel (E), the stimulatory algorithm will increment its associated score (430) whilst at the same time the second control message will act to decrement the score in the inhibitory algorithm (465). In order to prevent this, a mechanism is employed to prevent the inhibitory algorithm from decrementing the score of the channel currently monitored by the stimulatory algorithm 470. Alternatively the stimulatory algorithm may be arranged to increase the preference score of the selected channel (430) by more than the decrease of the preference score applied by the inhibitory algorithm (465).

The combined effect of the inhibitory (450) and stimulatory (400) algorithms on a nodes preference scoring of various channels over time is to provide a ranking or ranked list of preference scores of channels dependent on whether they appear to be free to use. If a channel is not used by other nodes, then there will be no response control messages (hoot y) received, whereas if a channel is being used by a pair of other nodes, then response control messages will be received which will reduce the preference score of this channel. If the node transmits a challenge message (hoot x) onto the selected channel, and this results in a response control message (hoot y) within the predetermined listening period, then this may mean that another node is also looking to use this channel and so the preference score is increased. Therefore, with a sufficiently high score, the controller (220) may allocate this channel to a transceiver (215) or airlink in order to establish a connection with this other node. The control messages (hoot x and y) continue in the background and have the effect of maintaining exclusive pairings of nodes on individual channels; much like pairs of owls maintain exclusive pairings by hooting to each other.

Looking at the effects from the network level, if a node were "exclusively paired" with another node but was to stop receiving response messages (hoot-y) from that other node in response to its own transmitted challenge messages (hoot x), for example because the other node had moved out of range, then the node's preference score for this channel may change. For example if further nodes test the channel for use but their control messages fall outside the current nodes stimulatory listening period, this will reduce the score for this channel which may eventually be taken over by a different pair of nodes. On the other hand, a different node may respond (hoot y) to the current nodes challenge control messages (hoot x) which will increase the preference for the channel for the other node and may eventually lead to a data connection between them on this channel.

The method also rapidly responds to changes, for example that one of the other nodes drops out of a semi-stable connection with the node under consideration, in which case the stimulatory challenge messages (hoot x) from this other node stop, and the response messages (hoot y) responding to the present node's stimulatory challenge control messages (hoot x) also stop. This allows another node to "take-over" the channel to "pair" with the present node. This is because the current or present node has a high preference score for the current channel, and the score for this channel will also increase on the other node as it responds to challenge control messages (hoot x) from the current node and also receives response messages (hoot y) from the current node in response to its own challenge control messages (hoot x). This may lead the other node's controller to try this channel if it has spare transceiver capacity, and thus a connection with the present node can be achieved.

In an alternative arrangement, three types of control messages could be used: a stimulatory challenge control message (hoot x); a stimulatory response message (new hoot z) which is transmitted in response to receiving a stimulatory challenge message; and an inhibitory response message (hoot y). This has the advantage that the stimulatory response message (hoot z) does not decrease the selected channel score in the inhibitory algorithm. In a further alternative, a single control message (hoot) may be used to act as both stimulatory (challenge) and inhibitory (response), using appropriate message timings in order to distinguish between the two functions for example. Various other methods of implementing stimulatory and inhibitory mechanisms for the selection of channels will now also be appreciated by the skilled person.

A further advantage of the use of inhibitory and stimulatory control messages to adjust channel scores for selection purposes is that the scores reflect monitoring of the channels (or their proxy channel messages), over a period of time rather than in a one-off poll say. This makes the assessment of each channel more accurate, and effectively filters out transient effects which might affect an instantaneous rating of a channel.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

The skilled person will also appreciate that the various embodiments and specific features described with respect to them could be freely combined with the other embodiments or their specifically described features in general accordance with the above teaching. The skilled person will also recognise that various alterations and modifications can be made to specific examples described without departing from the scope of the appended claims.

The invention claimed is:

1. A method of selecting a channel for a node in an ad hoc network of nodes, the method comprising:
increasing a preference score for a channel in response to receiving an anonymous stimulatory control message associated with the channel from another node;
decreasing the preference score for the channel in response to receiving an anonymous inhibitory control message associated with the channel from another node; and
selecting a channel dependent on the preference score for the channel.

2. A method according to claim 1, further comprising selecting a plurality of different channels from a set of channels according to their respective preference scores and communicating with a plurality of other nodes using said plurality of selected channels.

3. A method according to claim 2, further comprising selecting a new channel for communicating with one of said plurality of nodes in response to determining that one of said plurality of channels has degraded below a quality threshold, and communicating with said node with the newly selected channel instead of the degraded channel.

4. A method according to claim 2, further comprising selecting a new channel for communicating with one of said plurality of nodes in response to determining that the preference score for one of said plurality of channels has degraded below a predetermined preference score rating in a ranked list of preference scores associated with respective channels.

5. A method according to claim 2, further comprising selecting a new channel for communicating with one of said plurality of nodes in response to determining that no data is being transferred is being transferred between said nodes on one of said plurality of channels.

6. A method according to claim 1, wherein:
receiving a stimulatory control message comprises receiving a response control message associated with said channel from another node within a predetermined period following transmission of a challenge control message associated with said channel and;
receiving an anonymous inhibitory control message comprises receiving a response control message associated with said channel from another node in the absence of first transmitting a challenge control message (hoot x) associated with said channel.

7. A method according to claim 6, wherein receiving the inhibitory control message comprises receiving a response control message associated with said channel from another node outside the predetermined period following transmission of a challenge control message associated with said channel and in the absence of first transmitting a challenge control message associated with said channel; and/or the increase in the preference score associated with receiving the stimulatory message is greater than the decrease in the preference score associated with receiving the inhibitory message.

8. A method according to claim 6, wherein receiving the stimulatory control message comprises receiving only the first response control message associated with said channel from the other node within the predetermined period following transmission of the challenge control message associated with said channel.

9. A method according to claim 6, further comprising transmitting a response control message associated with said channel in response to receiving a challenge control message associated with said channel from another node.

10. A method according to claim 1, further comprising simultaneously monitoring all of a set of channels for receiving an anonymous inhibitory control message associated with the channel from another node; and monitoring one of said set of channels at a time for receiving an anonymous stimulatory control message associated with the channel from another node; the channel for monitoring for a stimulatory control signal being determined using a random selector together with the channels' associated preference score.

11. A method according to claim 1, wherein the stimulatory and inhibitory control messages associated with each channel are transmitted on one of: a common control channel wherein a message comprises a respective channel identifier; separate control channels each corresponding to a said channel; the respective channels.

12. A non-transitory computer-readable medium carrying computer program code which when run on a computer causes the computer to carry out a method according to claim 1.

13. A node for communicating wirelessly in an ad hoc network of nodes, said node comprising:
   a number of transceivers each for communicating with another node using a respective channel; and
   a channel selector for selecting a number of channels, said channel selector configured to:
      increase a preference score for a channel in response to receiving an anonymous stimulatory control message associated with the channel from another node;
      decrease the preference score for the channel in response to receiving an anonymous inhibitory control message associated with the channel from another node; and
      allocate a selected channel to a said transceiver dependent on the preference score for the channel.

14. A method of selecting a channel for a node in an ad hoc network of nodes, the method comprising:
   increasing a preference score for a channel in response to receiving a stimulatory control message associated with the channel from another node;
   decreasing the preference score for the channel in response to receiving an inhibitory control message associated with the channel from another node; and
   selecting a channel dependent on the preference score for the channel; wherein:
   receiving a stimulatory control message comprises receiving a response control message associated with said channel from another node within a predetermined period following transmission of a challenge control message associated with said channel; and
   receiving an inhibitory control message comprises receiving a response control message associated with said channel from another node in the absence of first transmitting a challenge control message (hoot x) associated with said channel.

15. A non-transitory computer-readable medium carrying computer program code which when run on a computer causes the computer to carry out a method according to claim 14.

* * * * *

UNITED STATES PATENT AND TRADEMARK OFFICE
CERTIFICATE OF CORRECTION

PATENT NO. : 8,428,012 B2  Page 1 of 1
APPLICATION NO. : 12/307967
DATED : April 23, 2013
INVENTOR(S) : Tateson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1052 days.

Signed and Sealed this
Eighth Day of September, 2015

Michelle K. Lee
*Director of the United States Patent and Trademark Office*